United States Patent Office 3,468,978
Patented Sept. 23, 1969

3,468,978
ETHYLENE COPOLYMER THERMOPLASTIC ADHESIVES
William R. Battersby, Lexington, Mass., assignor to United Shoe Machinery Corporation, Boston, Mass., a corporation of New Jersey
No Drawing. Original application Aug. 3, 1962, Ser. No. 214,486. Divided and this application Nov. 10, 1966, Ser. No. 593,298
Int. Cl. C08f 41/12
U.S. Cl. 260—897     3 Claims

ABSTRACT OF THE DISCLOSURE

Thermoplastic adhesive composition and flexible coilable rod of that composition for application in fluid molten condition to wet and bond surfaces to be joined. The adhesive is compounded to have a melt viscosity within the range of 20,000 to 250,000 centipoises at 190° C. by intimately mixing a copolymer of ethylene and vinyl acetate with hydrocarbon resins such as polyethylene and polyterpene resin in certain ranges of proportions.

---

This application is a division of my copending application Ser. No. 214,486, filed Aug. 3, 1962 entitled "Ethylene Copolymer Thermoplastic Adhesive," now abandoned.

This invention relates to thermoplastic adhesive compositions for application in molten fluid condition and particularly to rod or strand adhesives having improved storage, handling and application properties.

Rod or strand thermoplastic adhesives for direct through feed dispensing and applying systems provide the special advantages that materials otherwise subject to thermal decomposition under prolonged heating may be used to secure adhesive action not obtainable with more thermally stable materials. Also such adhesives may be applied under conditions permitting the bonding of surfaces at a high rate with precise close control to provide most effective bonding. A particularly useful adhesive in rod form is disclosed in the patent to Morris et al. 2,894,925 issued July 15, 1959 entitled "Polyethylene Containing Adhesives" which involves a combination of polyethylene with an isobutylene polymeric material and a hydrocarbon resin in certain proportions in which the components cooperate to give a desirable combination of properties for use in direct through feed systems.

Effective operation of a thermoplastic adhesive composition for application in fluid condition to wet and bond surfaces involves combining materials which cooperate to give flow characteristics in molten condition in which the adhesive is sufficiently low in viscosity to be pumped and to be spread into uniform wetting engagement with a surface, while at the same time the molten adhesive has a low tendency to flow when pressure is not applied. In the Morris et al. patent referred to above, such a combination of flow characteristics together with resilience and form stability enabling use as a coilable rod adhesive for direct through feed melting and applying, is secured by an intimate mixture of a rubbery isobutylene polymeric material with polyethylene and a hydrocarbon resin which has solvent power towards polyethylene at elevated temperatures.

It is an object of the present invention to provide a polyethylene base thermoplastic adhesive which does not require the isobutylene polymeric material to give the desired combination of properties for application in molten fluid condition and which has resilience and form stability for use as a coilable rod adhesive together with improved bonding to a variety of materials.

To this end and in accordance with a feature of the present invention there are provided hot melt adhesives in which high molecular weight linear copolymers of ethylene with vinyl acetate are combined with certain hydrocarbon resins in proportions to provide the properties needed for good adhesive action.

In the present adhesives thermoplastic hydrocarbon resins are combined with high molecular weight linear copolymers of ethylene and vinyl acetate in which the proportion of ethylene is sufficiently high to insure compatibility with the hydrocarbon resins and the vinyl acetate is present in amount to provide other desirable characteristics. Within the effective ranges of relative proportions, the copolymer and hydrocarbon resin cooperate to give flow characteristics, wetting and bonding ability for a variety of materials, open time and setting up characteristics providing superior flexibility of operation and rate of bonding. Also the bonds formed by the adhesive are strong, shock resistant and flexible and retain these properties even at relatively low temperatures. In the form of a thin rod or strand of uniform cross section for use with a direct through feed soft melting and applying device, the adhesive rod retains its dimensions and is flexible to be coiled and uncoiled for use over long periods of time and over a wide range of temperatures.

The copolymers of ethylene combined with hydrocarbon resin in the present adhesives are linear high molecular weight resinous materials ranging from about 100,000 to as high as 500,000 in molecular weight and having melting points in the range of from 90° C. to about 125° C. and melt viscosities of 150,000 to 600,000 centipoises as determined at 190° C. and a shearing rate of 20 reciprocal seconds on the Castor-Severs Extrusion Rheometer. These resins are obtained by polymerization of mixtures of ethylene monomer and vinyl acetate. For cooperation with the hydrocarbon resin it is important that these copolymers contain at least about 60% of the ethylene component and, in order to give the desired effect of the vinyl acetate, that the vinyl acetate be present to the extent of at least 10%. Thus, the copolymers will contain from 60% to 90% by weight of the ethylene component with from 40% to 10% by weight of the vinyl acetate component and particularly useful copolymers comprise from about 65% to about 80% by weight of ethylene with from about 35% to about 20% by weight of the vinyl acetate.

The polyethylenes useful in the present adhesive compositions are resinous materials as distinguished from waxes or greases and it is preferred that the molecular weight of these materials be above 10,000 or most desirably above 15,000.

Other hydrocarbon resins for use in the composition are characterized by having in molten form substantial solvent action on polyethylene resin. A preferred hydrocarbon resin is a polyterpene resin and specifically a β-pinene polymer having a melting point of 85° C. to 125° C. Other useful hydrocarbon resins possessing this solvent action in molten condition include resinous polymer products obtained by catalytic polymerization of mixed unsaturated monomers derived from cracked petroleum melting in the range of about 85° C. to about 150° C. and the resin separated from Utah type resin-bearing coal which consists essentially of carbon and hydrogen, has an average molecular weight of about 1,000, a refractive index of 1,544, a specific gravity of from 1.03 to 1.06 and a melting point of 160° C. to 180° C.

The resinous polyethylenes are substantially higher in molecular weight than the other hydrocarbon resins found useful in the present adhesive and serve a somewhat different purpose in the adhesive so that the adhesive may include both resinous polyethylene and one of the other hydrocarbon resins. In particular, the resinous polyethylenes cooperate with the ethylene copolymer so that a mixture of these has superior spreading characteristics in molten condition as well as firmness and coilability in rod or strand form and strength in the bond formed after solidification of the adhesive from molten condition. The hydrocarbon resins other than polyethylene are of particular use in increasing the ability of the adhesive in molten condition to wet surfaces to be bonded and in improving the compatibility of polyethylene and the ethylene copolymer so that the excellent mechanical properties of the ethylene copolymer and of the resinous polyethylene, when that is present, may operate effectively in holding together bonded surfaces.

Coaction of the ethylene copolymer and of the hydrocarbon resins in the hot melt adhesives is obtainable in a range of relative porportions give a range of adhesives useful for bonding a wide variety of materials and articles. It is important that the proportions of very high molecular weight ethylene copolymer and high molecular weight resinous polyethylene be kept within that range which will give the adhesive a melt viscosity within the range of 20,000 to 250,000 centipoises as determined at 190° C. and a shearing rate of 50 reciprocal seconds on the Castor-Severs Extrusion Rheometer. Thus, in order to insure that at least the minimum viscosity is attained it has been found that it is important that the sum of the weight of ethylene copolymer and the weight of resinous polyethylene, where it is present, be at least 40% and preferably at least 65% by weight of the thermoplastic components of the adhesive, and effective operation of the adhesive requires that there be no less than 20% of hydrocarbon resin and no less than 5% by weight of the ethylene copolymer in the composition. Where resinous polyethylene and the ethylene copolymer constitute the thermoplastic components of the adhesive, the preferred range of relative proportions by weight is from 5% to 15% of the copolymer and from 95% to 85% of the polyethylene. On the other hand where the relatively low molecular weight other hydrocarbon resins constitute, together with the ethylene copolymer, the thermoplastic components of the adhesive, the relative proportions by weight range from 20% to 35% of the hydrocarbon resin and from 80% to 65% of the copolymer.

In a coilable rod in which the thermoplastic components include ethylene copolymer, polyethylene and another hydrocarbon resin, the preferred ranges of relative proportions for cooperation of the three components to secure the combination of stability, flexibility and other properties needed for storage and handling of the rod for a direct through feed cement applying system, are from 15% to 40% of the ethylene copolymer, from 30% to 55% of the resinous polyethylene and from 20% to 35% of the other hydrocarbon resin.

Other materials than the ethylene copolymer and hydrocarbon resin thermoplastic components may be incorporated in the adhesive such as, for example, antioxidants or substituents which impart special properties such as very fine mineral fillers including calcium silicate, carbon black and the like.

The following examples are given as an aid in understanding the invention but it is to be understood that the invention is not restricted to the specific composition materials, proportions or method of preparation or use given in the examples.

EXAMPLE I

Thirty-five parts of a beta-pinene polymer resin was introduced into a heated mixer and melted by bringing its temperature to about 150° C. Thereafter there were added 20 parts by weight of a copolymer of ethylene and vinyl acetate in the proportions by weight of 72:28 having a weight average molecular weight of about 400,000 and a melt viscosity of 500,000 centipoises at 190° C. and shearing rate of 20 reciprocal seconds. 45 parts by weight of polyethylene having a melt index of 70 and a molecular weight about 16,000 was added and 1 part by weight of antioxidant was introduced. After thorough mixing the composition was extruded at a temperature of about 270° to 280° F. as a ¼ inch rod. The adhesive had a melt viscosity of about 85,000 centipoises at 190° C. and shearing rate of 50 reciprocal seconds.

The adhesive was applied at a temperature of about 400° F. and was useful for the bonding of kraft paper, cardboard and cellophane.

EXAMPLE II

This composition comprised 54 parts by weight of polyethylene of molecular weight of 22,000, 41 parts by weight of polyethylene having a molecular weight of 12,000 and 5 parts by weight of an ethylene-vinyl acetate copolymer as in Example I. The polyethylene materials were introduced into a heated mixer and brought to molten condition at a temperature of 320° to 340° F. and the ethylene-vinyl acetate copolymer was added and mixed in thoroughly. The composition was extruded at 300° to 320° F., cooled in a trough of water at a temperature of 55° F. and cooled on a reel. The adhesive had a melt viscosity of about 250,000 centipoises at 190° C. and shearing rate of 50 reciprocal seconds.

The cement was applied in a direct through feed cement dispensing and applying device at a temperature in the range of 450° to 500° F. and was used for bonding paper, paper products, polyethylene laminated substrates and so on.

Having thus described my invention, what I claim as new and desire to secure by Letters Patent of the United States is:

1. A solvent-free thermoplastic adhesive cement, dry, substantialy tack-free and solid at room temperature but softenable by heat to fluid molten condition for wetting and bonding surfaces to be joined, said adhesive having a melt viscosity within the range of 20,000 to 250,000 centipoises at 190° C. and shear rate of 50 reciprocal seconds, the thermoplastic components of said adhesive consisting essentially of (1) an intimate mixture of from about 5% to about 15% by weight of a high molecular weight copolymer of ethylene monomer and vinyl acetate monomer in the ratio of from about 60% to 90% by weight of ethylene to from about 40% to about 10% by weight of said vinyl acetate monomer, said copolymer having a melting point of from about 90° to about 125° C. and a melt viscosity of from 150,000 to 600,000 centipoises as determined at 190° C. and a shearing rate of 20 reciprocal seconds, and from about 95% to about 85% by weight of resinous polyethylene having a molecular weight above 10,000, or (2) an intimate mixture of from about 15% to about 40% by weight of a high molecular weight copolymer of ethylene monomer and vinyl acetate monomer in the ratio of from about 60% to 90% by weight of ethylene to from about 40% to about 10% by weight of said vinyl acetate monomer, said copolymer having a melting point of from about 90° to about 125° C. and a melt viscosity of from 150,000 to 600,000 centipoises as determined at 190° C. and a shearing rate of 20 reciprocal seconds, from about 30% to about 55% of resinous polyethylene having a molecular weight above 10,000 and from about 20% to about 35% by weight of a poly β-pinene having a melting point of 85° C. to 125° C.

2. As a new article of manufacture a rod composed of a thermoplastic adhesive cement, said rod being slender, flexible to be coiled and uncoiled, dry, substantially tack-free and solid at room temperature, softenable by heat to fluid condition for wetting and bonding surfaces to be joined, said adhesive having a melt viscosity within the range of 20,000 to 250,000 centipoises at 190° C. and shear rate of 50 reciprocal seconds, the thermoplastic components of said adhesive cement consisting essentially of an intimate mixture of from about 15% to about 40% by weight of a high molecular weight copolymer of ethylene monomer and vinyl acetate monomer in the ratio of from about 60% to 90% by weight of ethylene to from about 40% to about 10% by weight of said vinyl acetate monomer, said copolymer having a melting point of from about 90° to about 125° C. and a melt viscosity of from 150,000 to 600,000 centipoises as determined at 190° C. and a shearing rate of 20 reciprocal seconds, from about 30% to about 55% of resinous polyethylene having a molecular weight above 10,000 and from about 20% to about 35% by weight of a poly β-pinene having a melting point of 85° C. to 125° C.

3. As a new article of manufacture a rod composed of a thermoplastic adhesive cement, said rod being slender, flexible to be coiled and uncoiled, dry, substantially tack-free and solid at room temperature, softenable by heat to fluid condition for wetting and bonding surfaces to be joined, said adhesive having a melt viscosity within the range of 20,000 to 250,000 centipoises at 190° C. and shear rate of 50 reciprocal seconds, the thermoplastic components of said adhesive consisting essentially of an intimate mixture of from 5% to 15% by weight of a copolymer of ethylene monomer and vinyl acetate monomer in the range of from about 60% to 90% by weight of ethylene to from about 40% to about 10% by weight of said vinyl acetate monomer, said copolymer having a melting point of from about 90° to about 125° C. and a melt viscosity of from 150,000 to 600,000 centipoises at 190° C. and shearing rate of 20 reciprocal seconds, and from about 85% to about 95% by weight of resinous polyethylene having a melting point of at least 85° C. and having a molecular weight above 10,000.

References Cited

UNITED STATES PATENTS

| | | | |
|---|---|---|---|
| 3,275,494 | 9/1966 | Brunson et al. | 161—33 |
| 3,248,359 | 4/1966 | Maloney | 260—41 |
| 3,218,373 | 11/1965 | Salyer | 260—878 |
| 3,182,101 | 5/1965 | Rees | 260—885 |
| 2,912,398 | 11/1959 | Johnson et al. | 260—23.5 |
| 2,894,925 | 2/1954 | Morris et al. | 260—27 |

MURRAY TILLMAN, Primary Examiner

C. J. SECCURO, Assistant Examiner

U.S. Cl. X.R.

156—334; 161—251, 253; 260—27, 28.5, 41